(12) United States Patent
Sunaguchi et al.

(10) Patent No.: US 7,410,025 B2
(45) Date of Patent: Aug. 12, 2008

(54) VEHICLE

(75) Inventors: Naoto Sunaguchi, Shizuoka (JP);
Kaoru Kamimura, Shizuoka (JP);
Toshihiko Konno, Shizuoka (JP);
Yoshiharu Matsumoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 383 days.

(21) Appl. No.: 11/219,581

(22) Filed: Sep. 2, 2005

(65) Prior Publication Data

US 2006/0048991 A1     Mar. 9, 2006

(30) Foreign Application Priority Data

Sep. 3, 2004     (JP)     .............................. 2004-256426

(51) Int. Cl.
*B62K 11/00*     (2006.01)

(52) U.S. Cl. ........................ 180/229; 180/219; 180/68.1

(58) Field of Classification Search ................. 180/229, 180/219, 68.1
See application file for complete search history.

(56) References Cited

U.S. PATENT DOCUMENTS

| | | | | |
|---|---|---|---|---|
| 4,685,530 A | * | 8/1987 | Hara | ........................... 180/219 |
| 4,830,135 A | * | 5/1989 | Yamashita | ................... 180/229 |
| 4,913,256 A | * | 4/1990 | Sakuma | ....................... 180/229 |
| 5,176,111 A | * | 1/1993 | Nakamura et al. | ........ 123/41.01 |
| 5,301,767 A | * | 4/1994 | Shiohara | ...................... 180/219 |
| 5,577,570 A | * | 11/1996 | Shiohara et al. | ............. 180/219 |
| 6,276,482 B1 | * | 8/2001 | Moriya et al. | ............... 180/229 |
| 6,422,182 B1 | * | 7/2002 | Ohta | ........................ 123/41.29 |
| 6,695,088 B2 | * | 2/2004 | Schroeder | .................... 180/229 |

FOREIGN PATENT DOCUMENTS

| | | |
|---|---|---|
| JP | 2002-037165 | 2/2000 |
| JP | 2002-037166 | 2/2000 |

* cited by examiner

*Primary Examiner*—Lesley D. Morris
*Assistant Examiner*—Michael R Stabley
(74) *Attorney, Agent, or Firm*—Keating & Bennett, LLP

(57) ABSTRACT

A vehicle, such as an under-bone type motorcycle, can guide a sufficient amount of running wind to a core section of a radiator (heat exchanger). The vehicle includes a head pipe, a main frame connected to the head pipe to extend downward and rearward, an engine disposed below the main frame, a leg shield covering a front side of a leg of a driver and having an opening in a forward area thereof, a radiator disposed within the opening of the leg shield which includes a core section through which running wind passes thus cooling the engine, and a wind guiding wall attached to the leg shield to guide the running wind to the radiator. The wind guiding wall includes a forward section that protrudes forward from a front end surface of the opening of the leg shield and a rear section that has a rear end positioned adjacent to a lateral side end of the core section of the radiator.

14 Claims, 15 Drawing Sheets

VEHICLE

BACKGROUND OF THE INVENTION

1. Field of the Invention

The present invention relates to a vehicle, and particularly relates to a vehicle that has a heat exchanger for cooling an engine.

2. Description of the Related Art

Conventionally, motorcycles having a heat exchanger for cooling an engine are known (for example, see Patent Document JP-A-2002-37166 and Patent Document JP-A-2002-37165).

Patent Document JP-A-2002-37166 discloses a motorcycle having a radiator (heat exchanger) for cooling an engine disposed within a leg shield that covers front sides of the legs of a driver and has an opening in its forward area. In this structure, cooling water of the radiator is considered to be cooled by a portion of running wind introduced through the opening of the leg shield impinging the radiator.

Patent Document JP-A-2002-37165 discloses another motorcycle having a radiator (heat exchanger) for cooling an engine disposed within a leg shield, and a radiator grille that has a wind introducing window positioned in front of the radiator within the leg shield and being smaller than a core section of the radiator.

The structure disclosed in Patent Document JP-A-2002-37166 has difficulty in guiding a sufficient amount of the running wind to the radiator, because the structure has no construction for further guiding the running wind which has been introduced from the opening of the leg shield to the radiator. Thus a problem occurs in that it is difficult to sufficiently cool the engine because it is difficult to sufficiently cool the cooling water in the radiator (heat exchanger).

The structure disclosed in Patent Document JP-A-2002-37165 can further guide the running wind introduced from the opening of the leg shield using the wind introducing window to the core of the radiator because the radiator grille that has the wind introducing window is positioned in front of the radiator. However, in this Patent Document, the wind introducing window placed in the radiator grille is smaller than the core section of the radiator. Thus, it is difficult to expose the whole area of the core section of the radiator against the running wind. Accordingly, it is difficult to increase an amount of the running wind that impinges the core section of the radiator, and hence it is difficult to sufficiently cool the cooling water in the radiator (heat exchanger). As a result, the problem that it is difficult to sufficiently cool the engine occurs again.

SUMMARY OF THE INVENTION

In order to overcome the problems described above, preferred embodiments of the present invention provide a vehicle that can guide a sufficient amount of running wind to a core section of a heat exchanger.

A vehicle according to a preferred embodiment of the present invention includes a head pipe, a frame connected to the head pipe to extend downward and rearward, an engine disposed below the frame, a leg shield covering a front side of a leg of a driver and having an opening in a forward area thereof, a heat exchanger disposed within the opening of the leg shield including a core section through which running wind passes and cooling the engine, and a wind guiding wall attached to the leg shield to guide the running wind to the heat exchanger. The wind guiding wall includes a forward section that protrudes forward from a front end surface of the opening of the leg shield, and a rear section that has a rear end positioned adjacent to a lateral side end of the core section of the heat exchanger.

As described above, the vehicle according to the present preferred embodiment is constructed such that, in an underbone type vehicle that has the frame extending downward and rearward from the head pipe, the wind guiding wall that guides running wind to the heat exchanger is attached to the leg shield covering the front side of the leg of the driver, and the wind guiding wall includes the forward section that protrudes forward from the front end surface of the opening of the leg shield and the rear section that has the rear end positioned adjacent to the lateral side end of the core section. Thus, the running wind introduced from the forward section of the wind guiding wall is guided to the whole core section of the heat exchanger by the rear end of the wind guiding wall. Accordingly, a sufficient amount of the running wind can be guided to the core section of the heat exchanger. Thereby, the cooling water in the heat exchanger can be cooled enough and thus the engine can be sufficiently cooled. Also, the forward section of the wind guiding wall protrudes forward from the front end surface of the leg shield. Thereby, a distance between the heat exchanger and a front end of the forward section of the wind guiding wall can be larger than a distance between the heat exchanger and the front end surface of the opening of the leg shield. Thus, even if the distance between the heat exchanger and the front end surface of the opening of the leg shield is smaller, the forward section of the wind guiding wall can inhibit a wind guiding distance of the running wind to the heat exchanger from being too short. As a result, a decrease of a wind guiding amount, which is likely to be caused when the distance of the running wind to the heat exchanger is too short, can be prevented from occurring. Thus, a sufficient amount of the running wind can be guided to the core section of the heat exchanger.

Other features, elements, characteristics, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described with respect to the attached figures.

Figure 1:
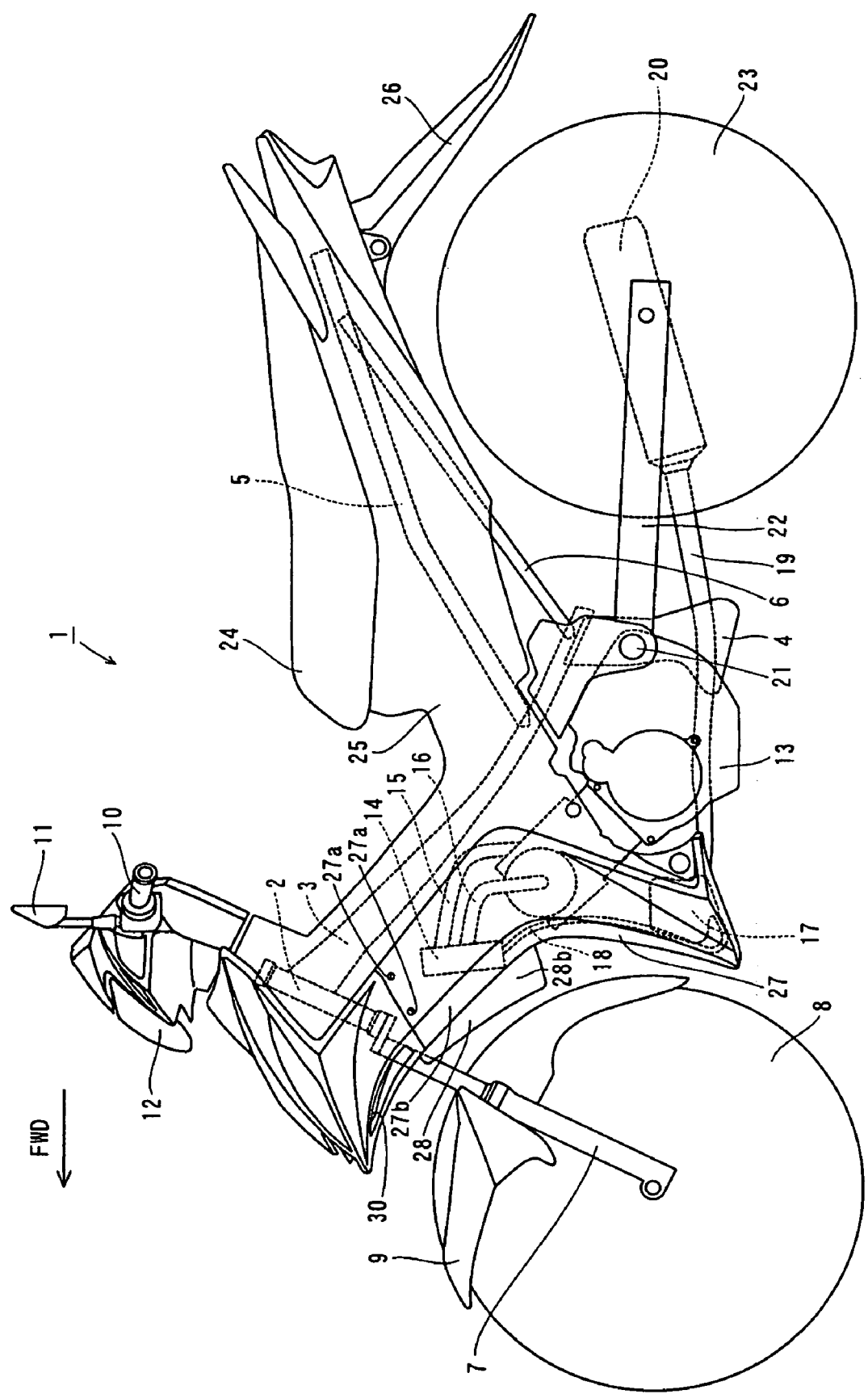
FIG. 1 is a side elevational view showing the overall structure of a motorcycle according to a preferred embodiment of the present invention.
Figure 2:
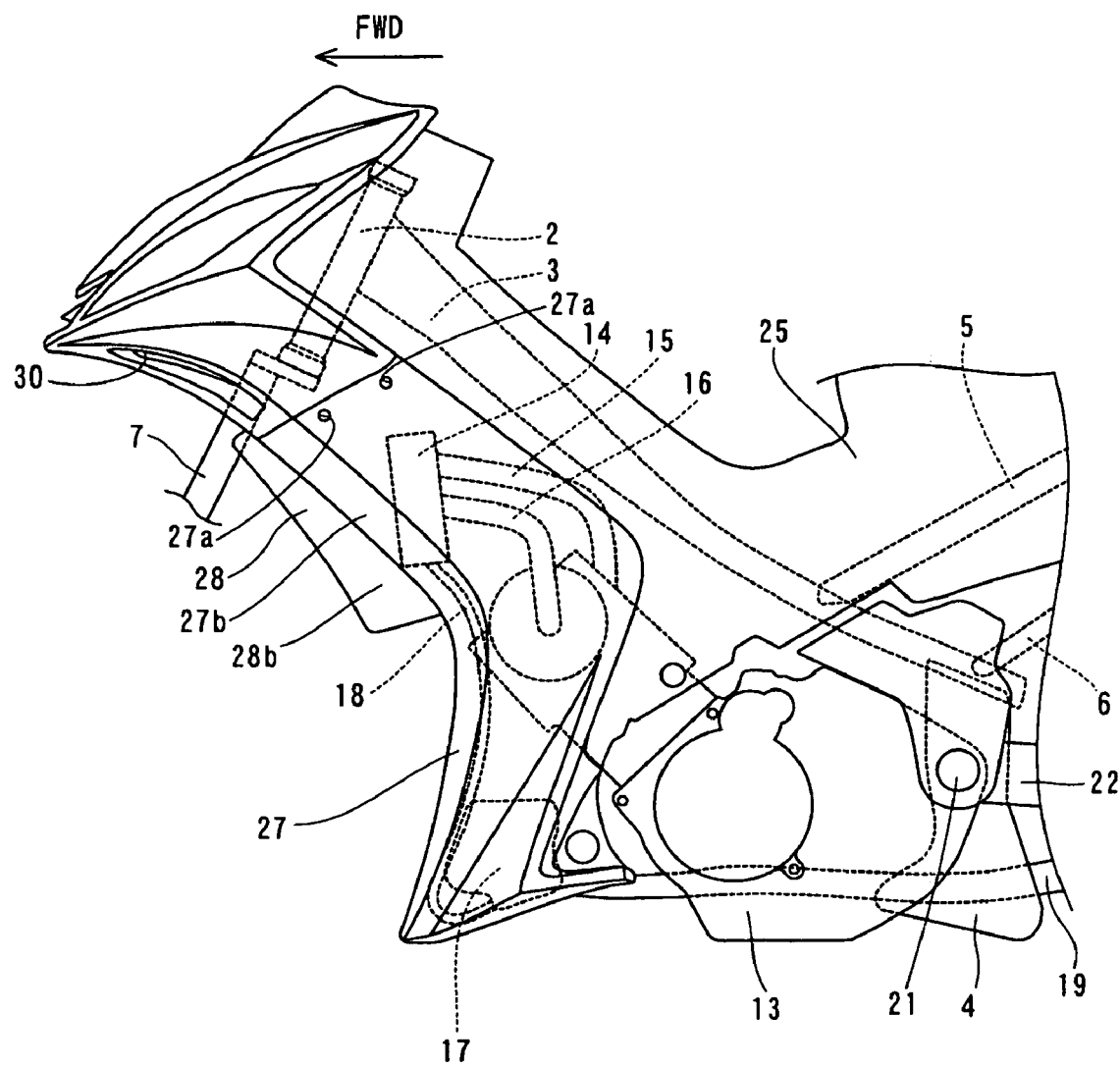
FIG. 2 is an enlarged side elevational view of an engine of the motorcycle according to the preferred embodiment shown in FIG. 1 and also the vicinity of the engine.
Figure 3:
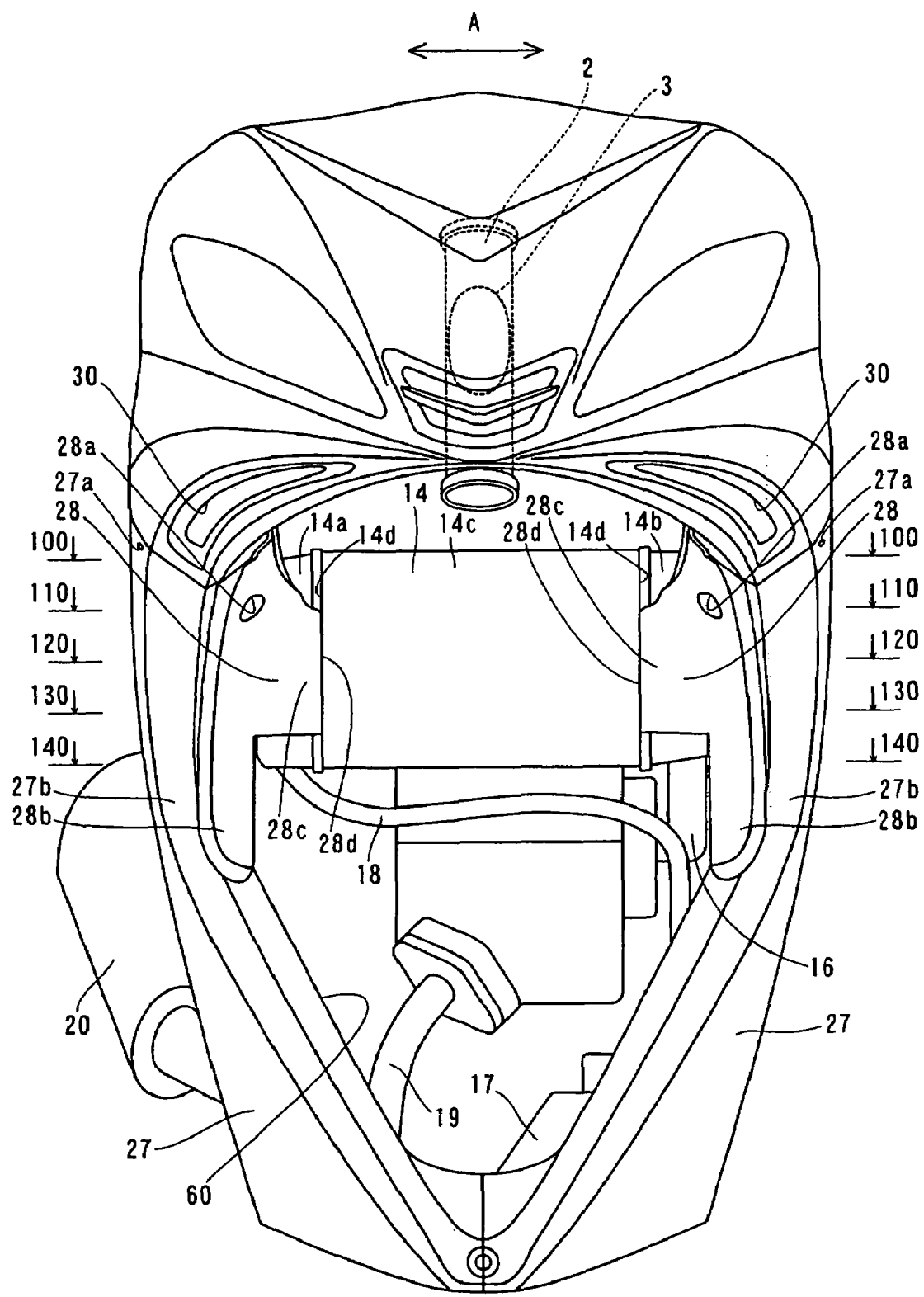
FIG. 3 is a front elevational view of a leg shield of the motorcycle according to the preferred embodiment shown in FIG. 1 and the vicinity of the leg shield.
Figure 4:
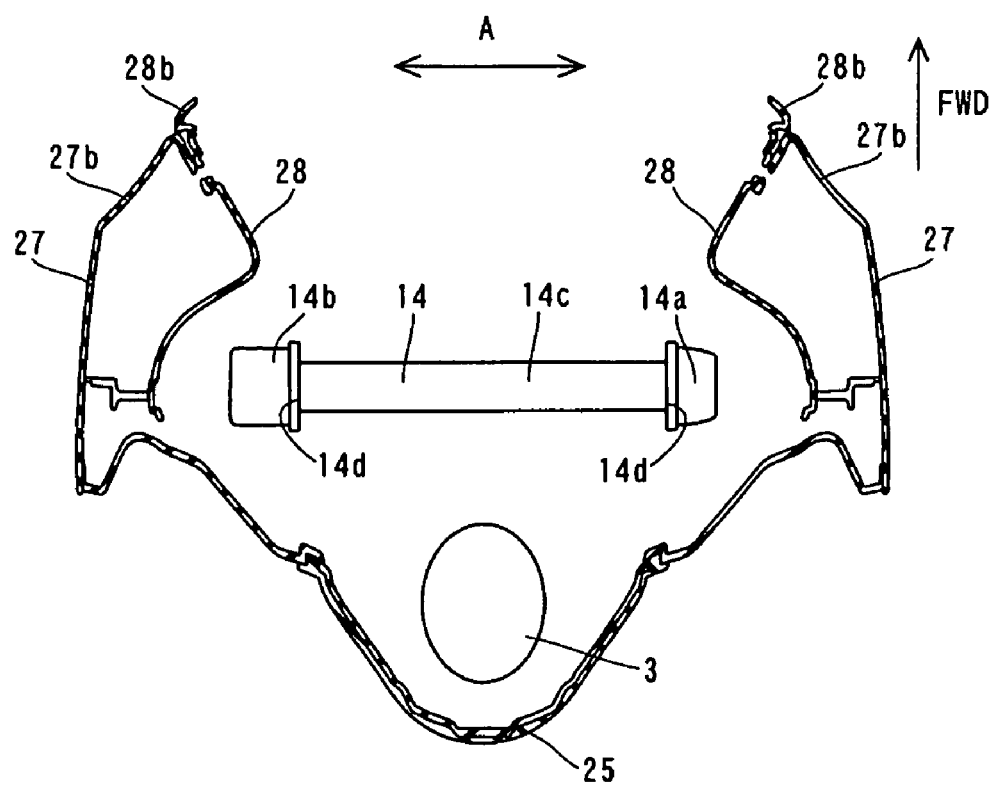
FIG. 4 is a cross sectional view taken along the line 100-100 of FIG. 3.
Figure 5:
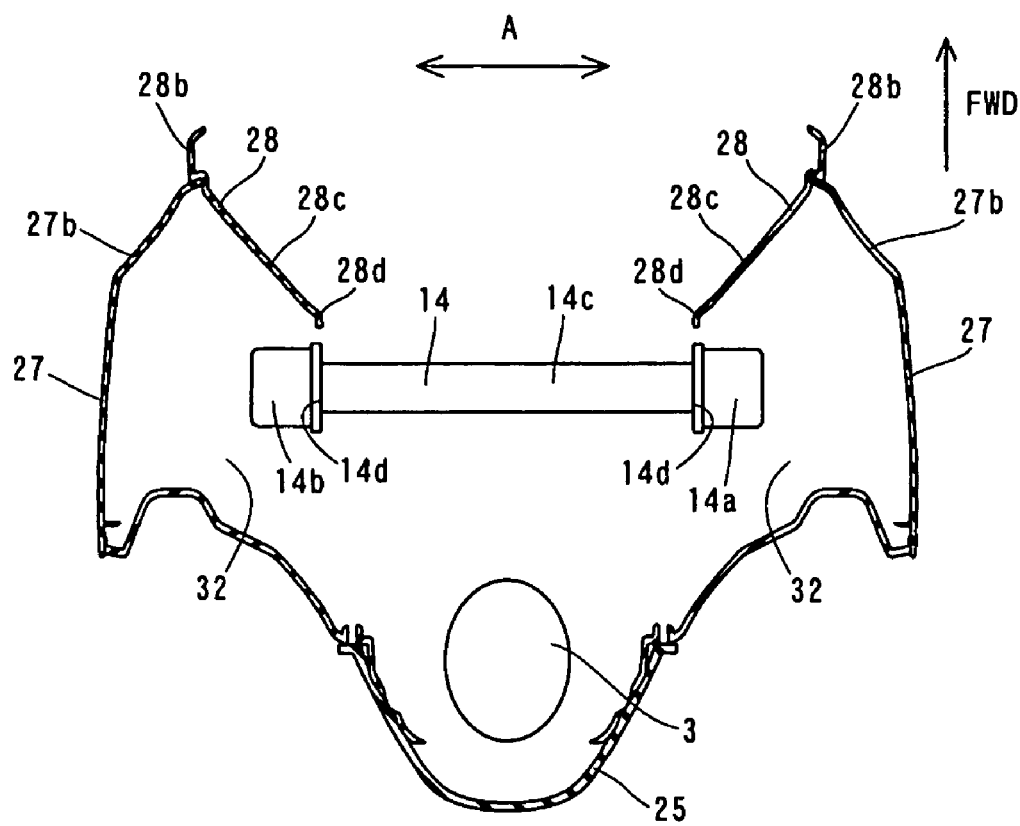
FIG. 5 is a cross sectional view taken along the line 110-110 of FIG. 3.

FIG. 1 is a side elevational view showing the overall structure of a motorcycle according to a preferred embodiment of the present invention. FIG. 2 is an enlarged side elevational view of an engine of the motorcycle according to the preferred embodiment shown in FIG. 1 and also the vicinity of the engine. FIG. 3 is a front elevational view of a leg shield of the motorcycle according to the preferred embodiment shown in FIG. 1 and the vicinity of the leg shield. FIGS. 4-16 are illustrations for describing detailed constructions of the motorcycle according to the preferred embodiment shown in FIG. 1. Additionally, in the figures, reference mark FWD indicates "forward" in a running direction of the motorcycle. Also, in the present preferred embodiment, an under-bone type motorcycle is described as an example of a vehicle in which the frame (main frame) of the motorcycle between a seat and handle bars is lowered such that a rider can easily straddle the seat. Hereunder, with reference to FIGS. 1-16, a structure of the motorcycle according to the present preferred embodiment is described in detail.

As shown in FIG. 1, a forward end of a main frame 3 is connected to a head pipe 2 in an under-bone type motorcycle 1 according to a preferred embodiment of the present invention. Incidentally, this main frame 3 is an example of the "frame" of the present invention. Also, the main frame 3 is arranged to extend downward and rearward. Further, a rear arm bracket 4 is connected to a rear end of the main frame 3. In addition, seat rails 5 are connected to the main frame 3 so as to extend upward and rearward. Also, back stays 6 extend between the rear end of the main frame 3 and respective rear portions of the seat rails 5. The head pipe 2, main frame 3, rear arm bracket 4, seat rails 5 and back stays 6 together define a vehicle body frame.

A pair of front forks 7 is positioned below the head pipe 2. A front wheel 8 is coupled with a bottom of the pair of front forks 7 for rotation. A front fender 9 is disposed above the front wheel 8 to cover a top of the front wheel 8. Also, handle bars 10 are coupled with a top of the head pipe 2 for pivotal movement. A rearview mirror 11 is attached to each handle bar 10 at a portion thereof closer to an inner end of each handle bar 10. Also, a head lamp 12 is positioned to face forward at the inner ends of the handle bars 10.

As shown in FIGS. 1 and 3, an engine 13 is placed below the main frame 3. As shown in FIGS. 1 and 2, this engine 13 is positioned such that an axis of a cylinder obliquely extends upward and forward. Also, as shown in FIG. 1, a radiator 14 for cooling the engine 13 is placed at a forward and upper location relative to the engine 13 and below the main frame 3. Incidentally, the radiator 14 is an example of a "heat exchanger" of the present invention. Also, as shown in FIG. 3, the radiator 14 includes a pair of tank sections 14a and 14b spaced apart from each other at a predetermined distance in a width direction (direction A) of the motorcycle 1, and a core section 14c positioned between the pair of tank sections 14a and 14b. This core section 14c has a large number of apertures which are not shown and through which running wind 50 passes. Also, as shown in FIG. 1, the radiator 14 is coupled with the engine 13 by a supply pipe 15 and a return pipe 16.

Figure 14:
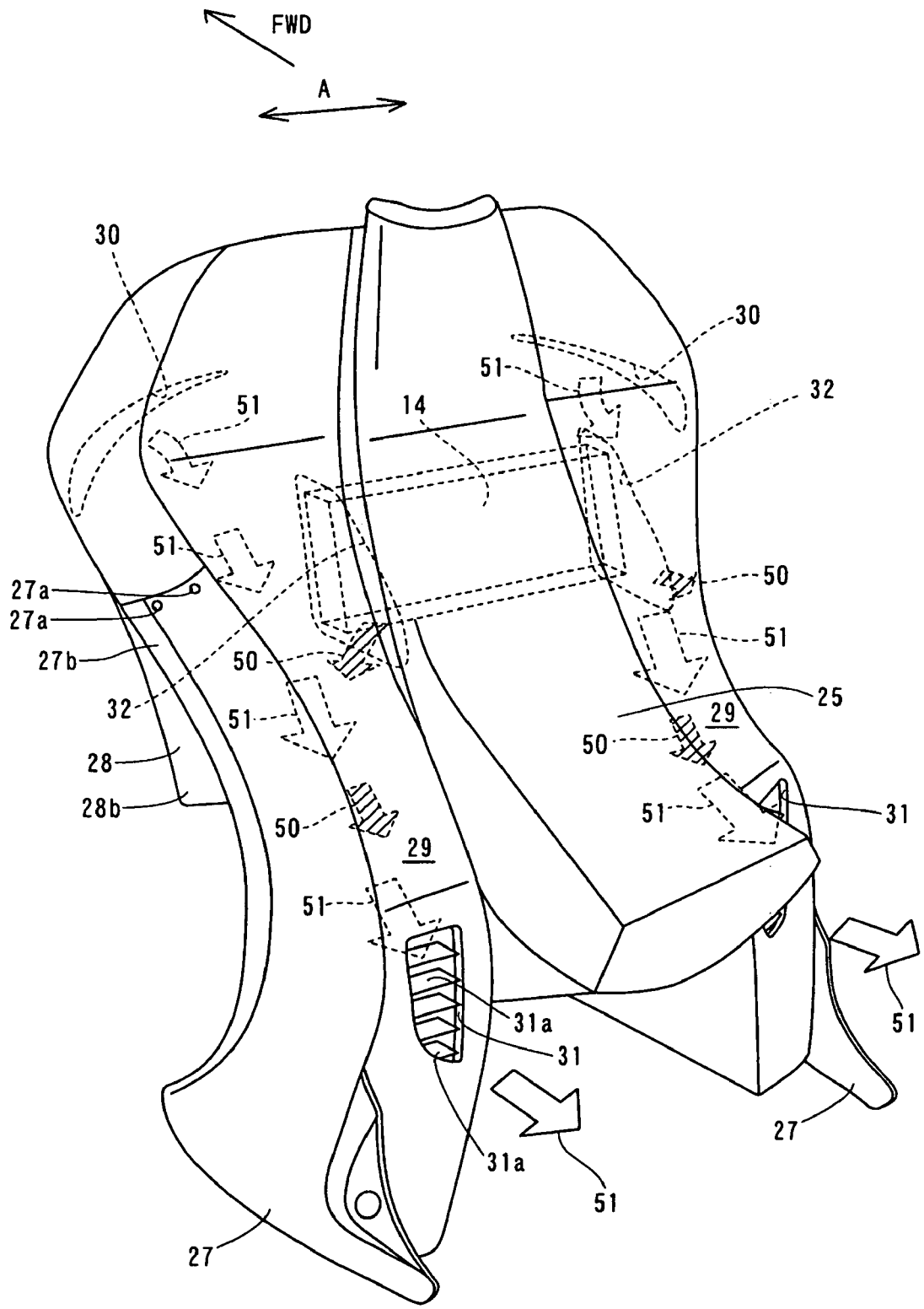
FIG. 14 is a perspective view for describing a flow of running wind relative to the wind guiding wall of the motorcycle according to the preferred embodiment shown in FIG. 1.

When the radiator 14 cools the engine 13, first, cooling water that becomes warm after cooling the engine 13 is sent to the tank section 14a (see FIG. 3) of the radiator 14 through the supply pipe 15. After the warmed water is cooled in the core section 14c (see FIG. 3), the water is sent to the tank section 14b (see FIG. 3) of the radiator 14. Then, the cooled water returns to the engine 13 through the return pipe 16. Additionally, as shown in FIG. 14, in the core section 14c of the radiator 14, the cooling water is cooled (heat radiation) by the running wind (air) 50 impinging a front surface and passing through the core section 14c when the motorcycle 1 (see FIG. 1) runs.

As shown in FIGS. 1 and 3, a reserve tank (recovery tank) 17 of the radiator 14 is placed at a forward and lower location relative to the engine 13. This reserve tank 17 accumulates a portion of the cooling water that has increased because the cooling water of the radiator 14 becomes hotter, so as to keep an amount of the cooling water in the radiator 14 constant. Also, the reserve tank 17 is coupled with the radiator 14 by a charge and discharge pipe 18. Further, an exhaust pipe 19 is attached to a lower portion of the engine 13. This exhaust pipe 19 curves rightward relative to the running direction (the arrow FWD direction) and extends rearward to be coupled with a muffler 20.

As shown in FIG. 1, the rear arm bracket 4 connected to the main frame 3 has a pivot shaft 21. This pivot shaft 21 journals a forward end of the rear arm 22 for vertical swing movement. A rear wheel 23 is coupled with a rear end of this rear arm 22 for rotation. Also, a seat 24 is placed above the seat rails 5. Further, a vehicle body cover 25 extends between a rear side and a front side of the vehicle body to cover the head pipe 2 and the seat rails 5. In addition, as shown in FIG. 1, a rear fender 26 is attached to a rear side of the vehicle body cover 25 in the running direction (the arrow FWD direction in FIG. 1) to cover a top of the rear wheel 23.

Figure 13:
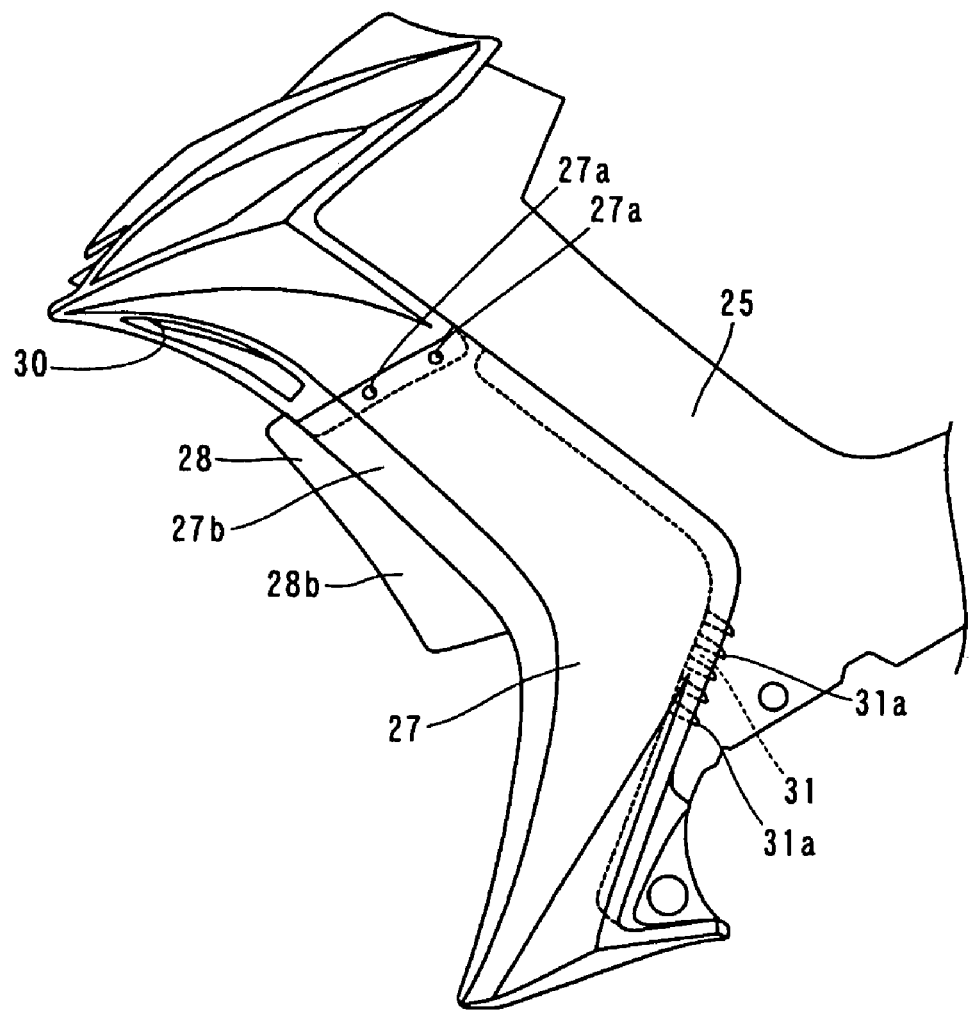
FIG. 13 is a side elevational view for describing a coupling structure of the leg shield of the motorcycle according to the preferred embodiment shown in FIG. 1 to a vehicle body cover.

In the present preferred embodiment, as shown in FIGS. 2-8, a forward side of the vehicle body cover 25 in the running direction (the arrow FWD direction in FIG. 1) has a pair of leg shields 27 that are spaced apart from each other at a predetermined distance in the width direction (direction A) to cover front sides of the legs of a driver and has an opening 60. The pair of leg shields 27 is disposed on both sides of the radiator 14 to interpose the radiator 14 therebetween. Also, as shown in FIG. 13, each leg shield 27 has a plurality of screw holes 27a for screws to fix the shield to the vehicle body cover 25. Also, a forward portion 27b of each leg shield 27 has a configuration tapered inward and forward such that the respective forward portions 27b approach each other in the width direction of the vehicle body (the direction A of FIG. 3).

Figure 6:
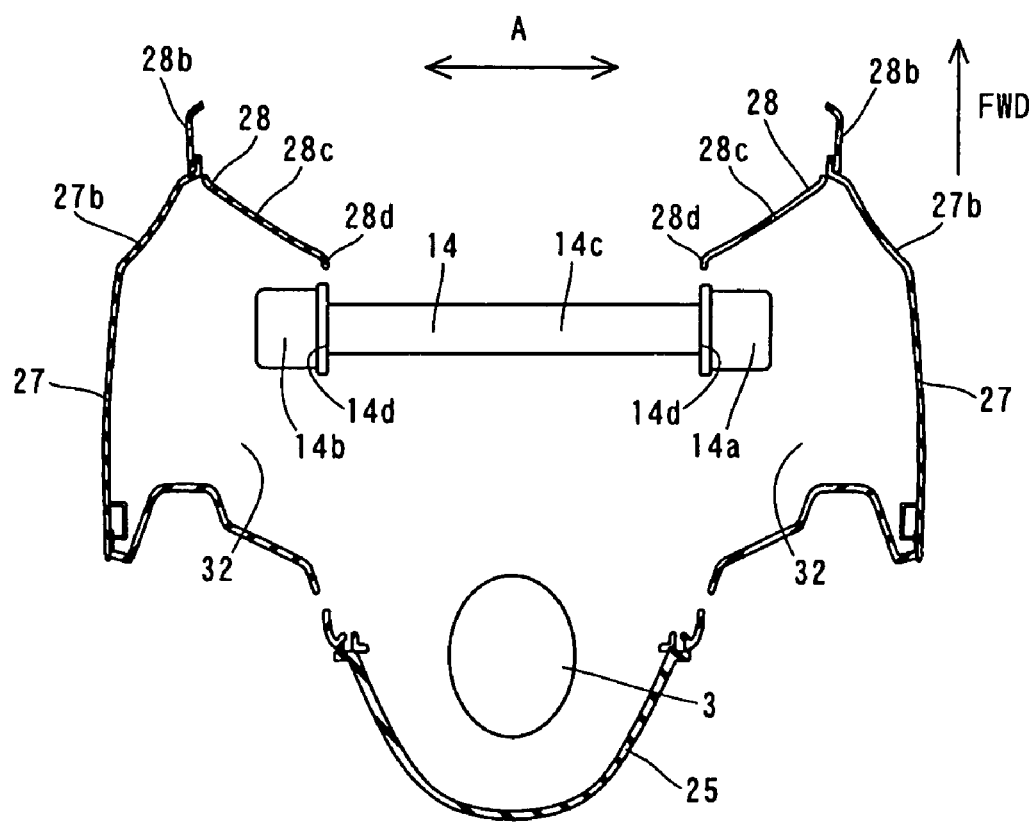
FIG. 6 is a cross sectional view taken along the line 120-120 of FIG. 3.
Figure 7:
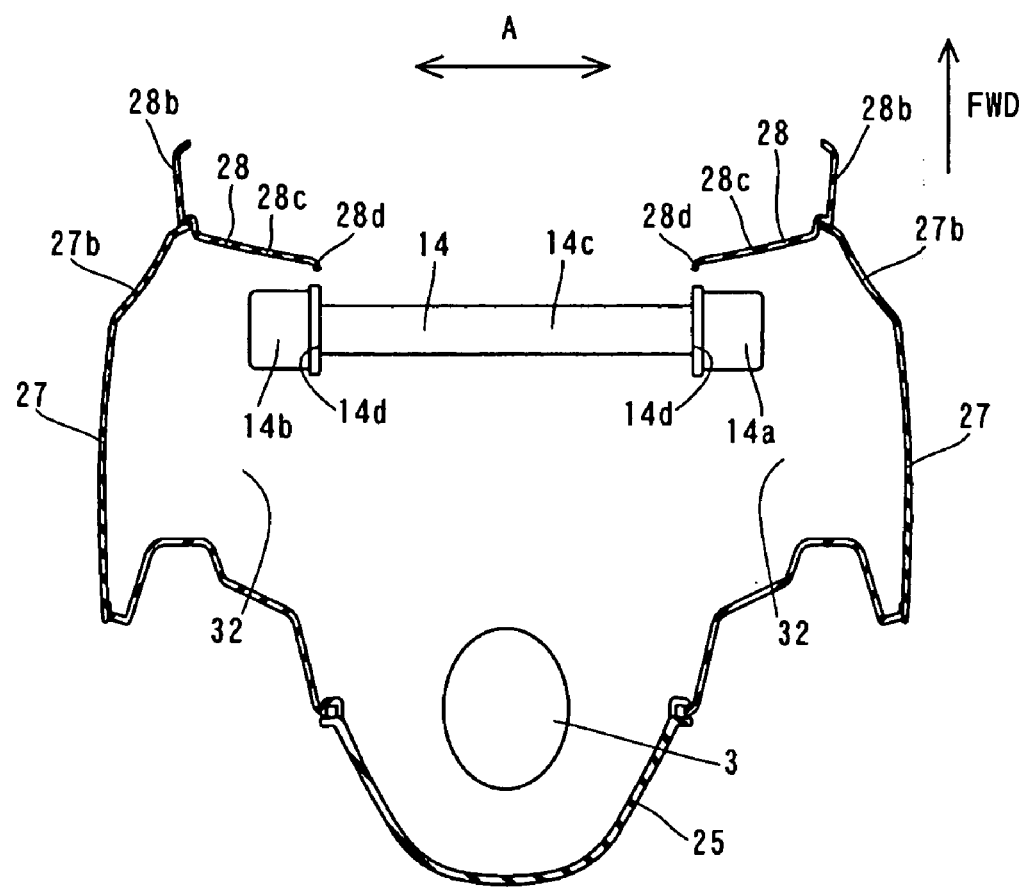
FIG. 7 is a cross sectional view taken along the line 130-130 of FIG. 3.
Figure 8:
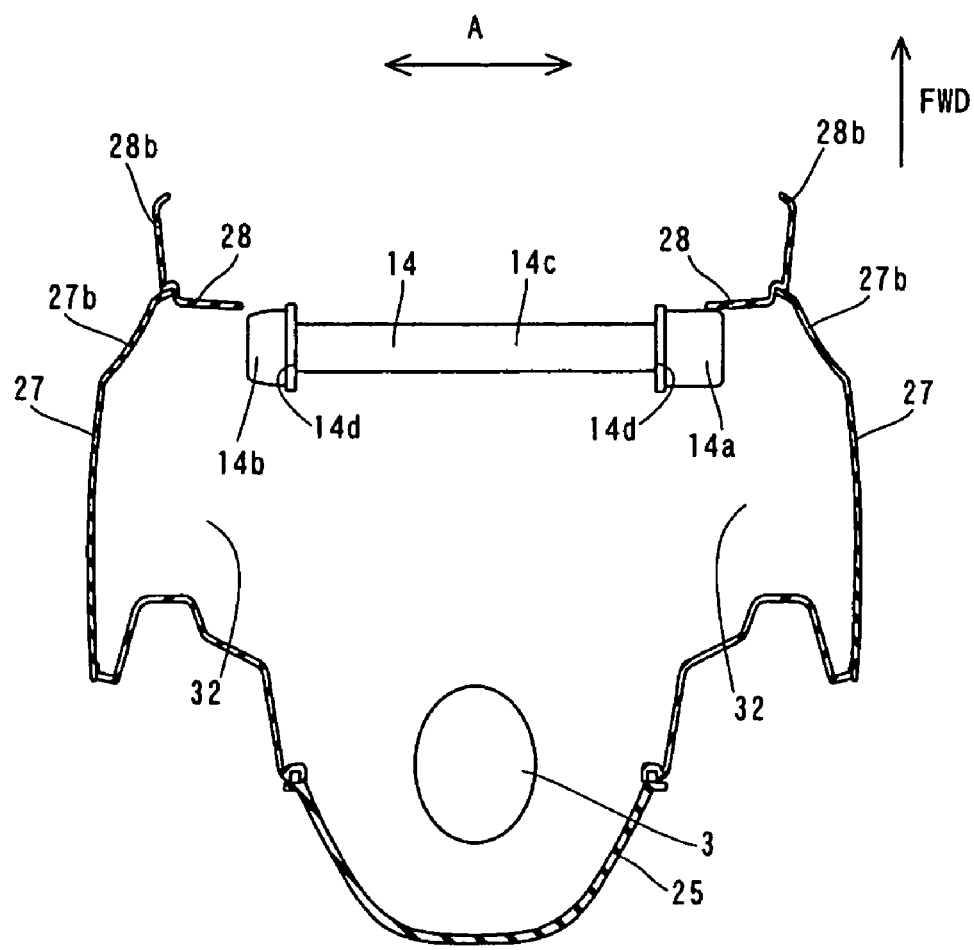
FIG. 8 is a cross sectional view taken along the line 140-140 of FIG. 3.
Figure 9:
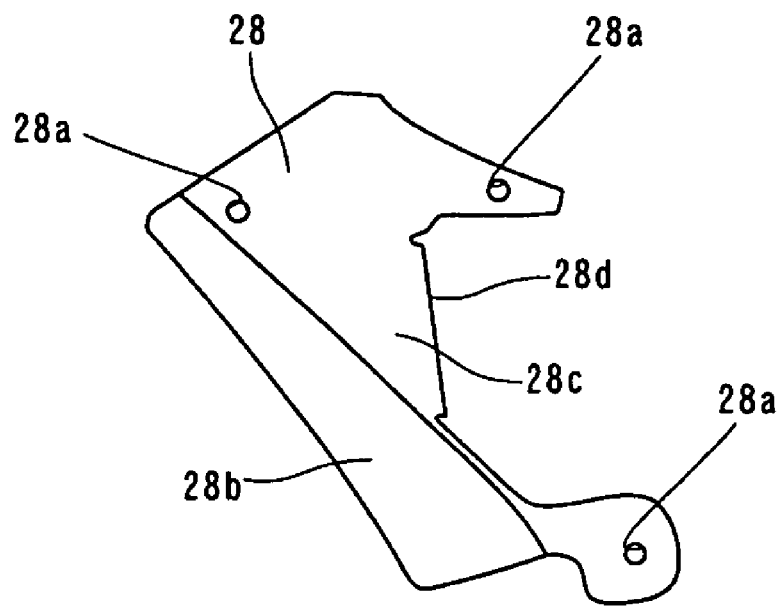
FIG. 9 is a side elevational view showing a detailed structure of a wind guiding wall of the motorcycle according to the preferred embodiment shown in FIG. 1.
Figure 10:
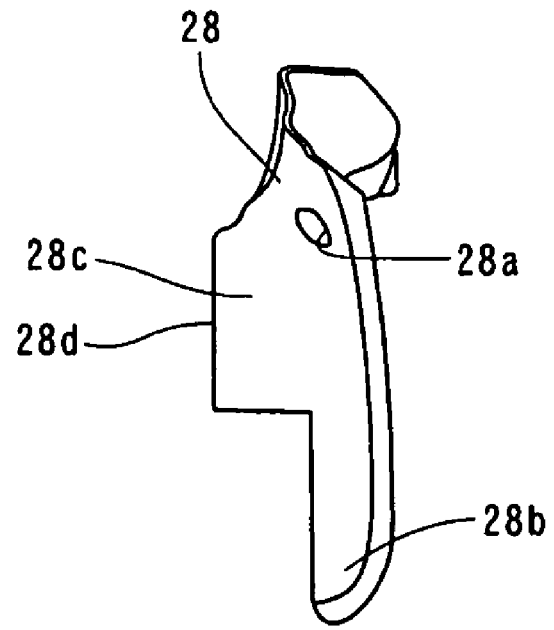
FIG. 10 is a front elevational view showing the detailed structure of the wind guiding wall of the motorcycle according to the preferred embodiment shown in FIG. 1.
Figure 11:
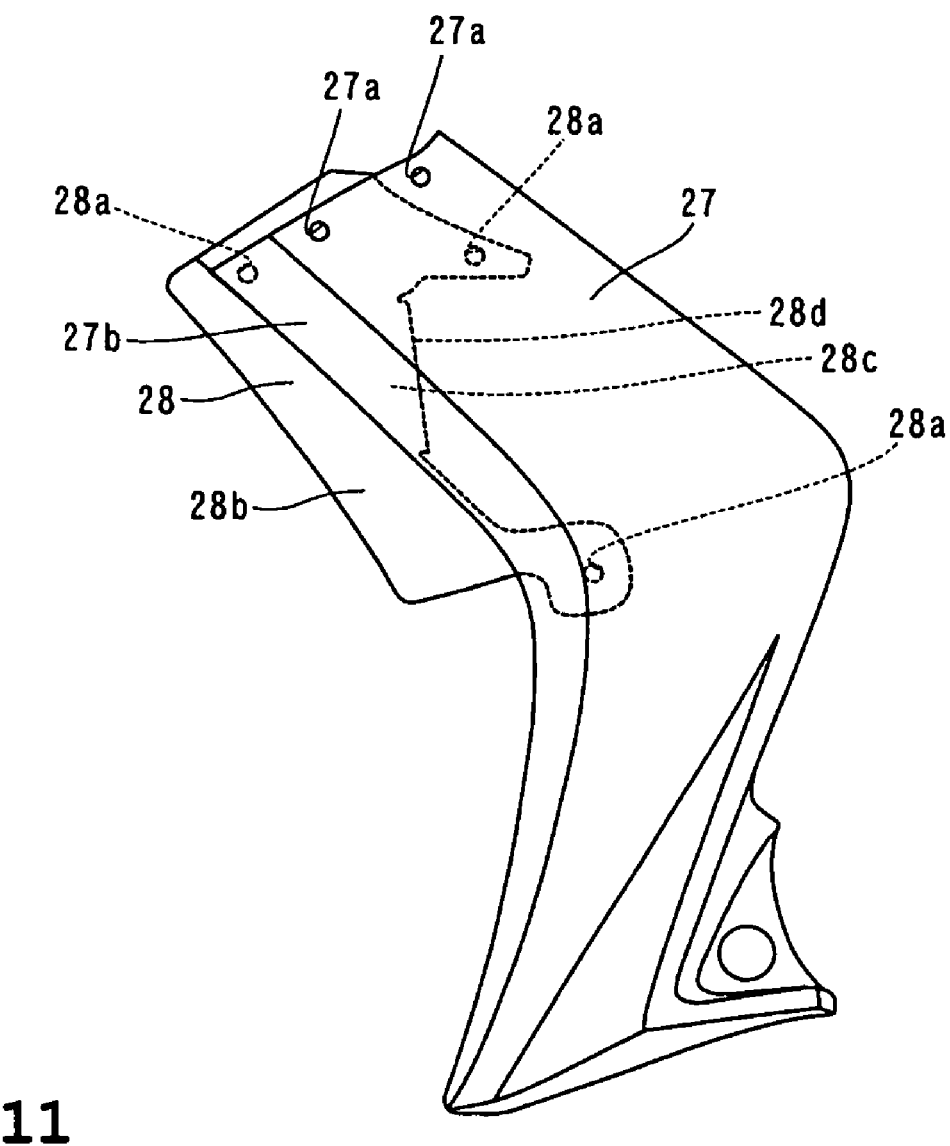
FIG. 11 is a side elevational view for describing a coupling structure of the wind guiding wall of the motorcycle according to the preferred embodiment shown in FIG. 1 to a leg shield.
Figure 12:
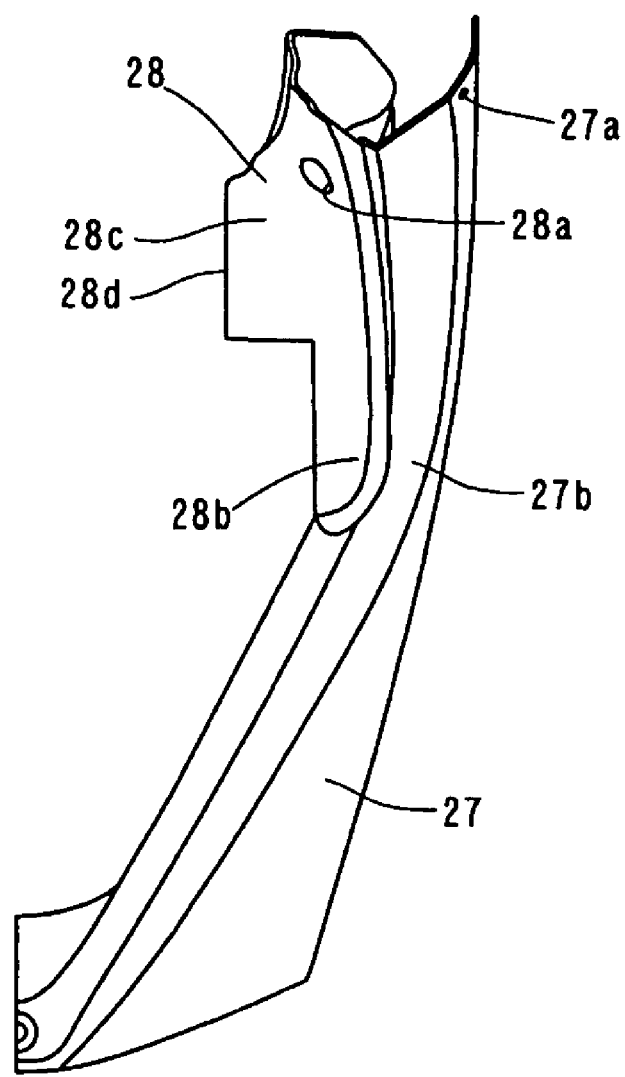
FIG. 12 is a front elevational view for describing the coupling structure of the wind guiding wall of the motorcycle according to the preferred embodiment shown in FIG. 1 to the leg shield.
Figure 15:
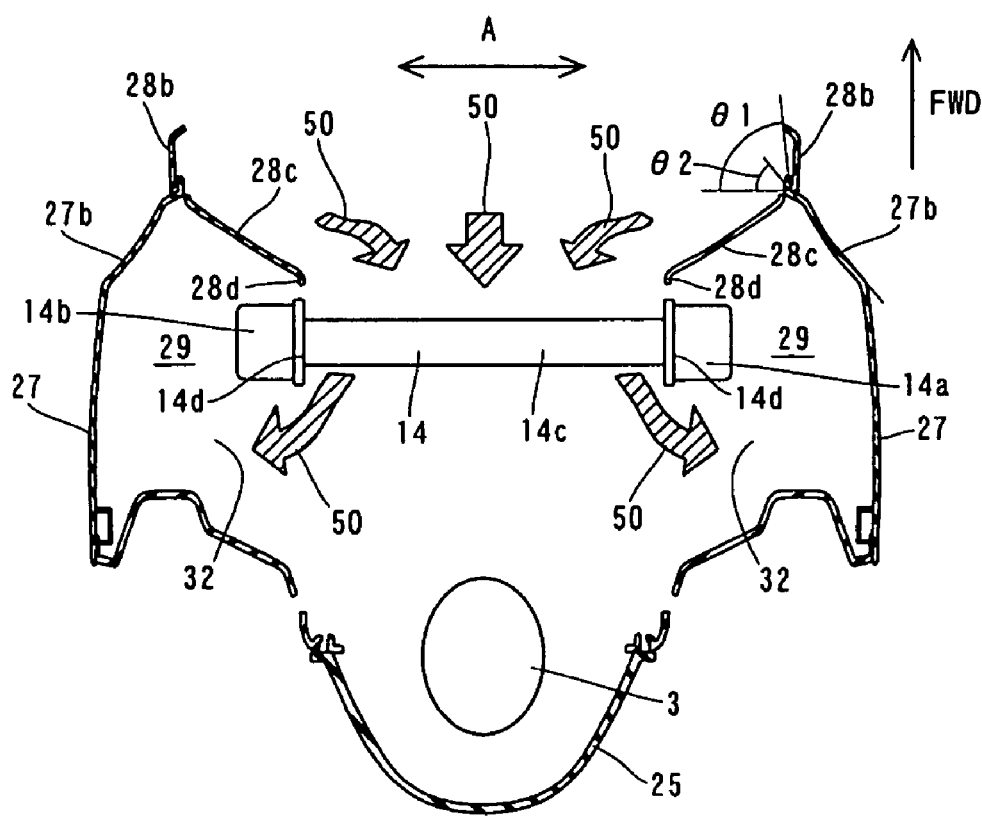
FIG. 15 is a cross sectional view for describing the flow of the running wind relative to the wind guiding wall of the motorcycle according to the preferred embodiment shown in FIG. 1.

Also, in the present preferred embodiment, as shown in FIGS. 11, 12 and 15, each leg shield 27 has a wind guiding wall 28, preferably made of resin or other suitable material, attached thereto for guiding the running wind 50 to the radiator 14. As shown in FIGS. 9 and 10, each wind guiding wall 28 has a plurality of screw holes 28a, a forward section 28b and a rear section 28c. As shown in FIGS. 3 and 6, the forward section 28b of each wind guiding wall 28 is arranged to protrude forward from a front end surface of the leg shield 27. Also, as shown in FIG. 2, a size of the forward section 28b of the wind guiding wall 28 in a fore to aft direction becomes larger while approaching a bottom of the wind guiding wall 28. Also, a rear end 28d of the rear section 28c of each wind guiding wall 28 is positioned adjacent to one of the lateral side ends 14d of the core section 14c of the radiator 14 in the width direction of the vehicle body (the direction A of FIG. 3) in a front view. That is, the rear section 28c of each wind guiding wall 28 is positioned to cover a front side of the tank section 14a or 14b of the radiator 14, and to substantially not cover a front side of the core section 14c of the radiator 14. Also, as shown in FIG. 6, the rear section 28c of each wind guiding wall 28 extends inward and rearward such that respective rear sections 28c of the wind guiding walls 28 approach each other in the width direction of the vehicle body (the direction A of FIG. 3). Further, as shown in FIG. 15, each wind guiding wall 28 is arranged such that an expanding angle θ1 of the forward section 28b of the wind guiding wall 28 that expands forward is larger than an expanding angle θ2 of a forward portion of each leg shield 27 that expands forward. Also, as shown in FIG. 2, a size of each wind guiding wall 28 in height is larger than a size of the radiator 14 in height in a side view. Further, the size of each wind guiding wall 28 in height is smaller than a size of the respective leg shields 27 in height in the side view.

Figure 16:
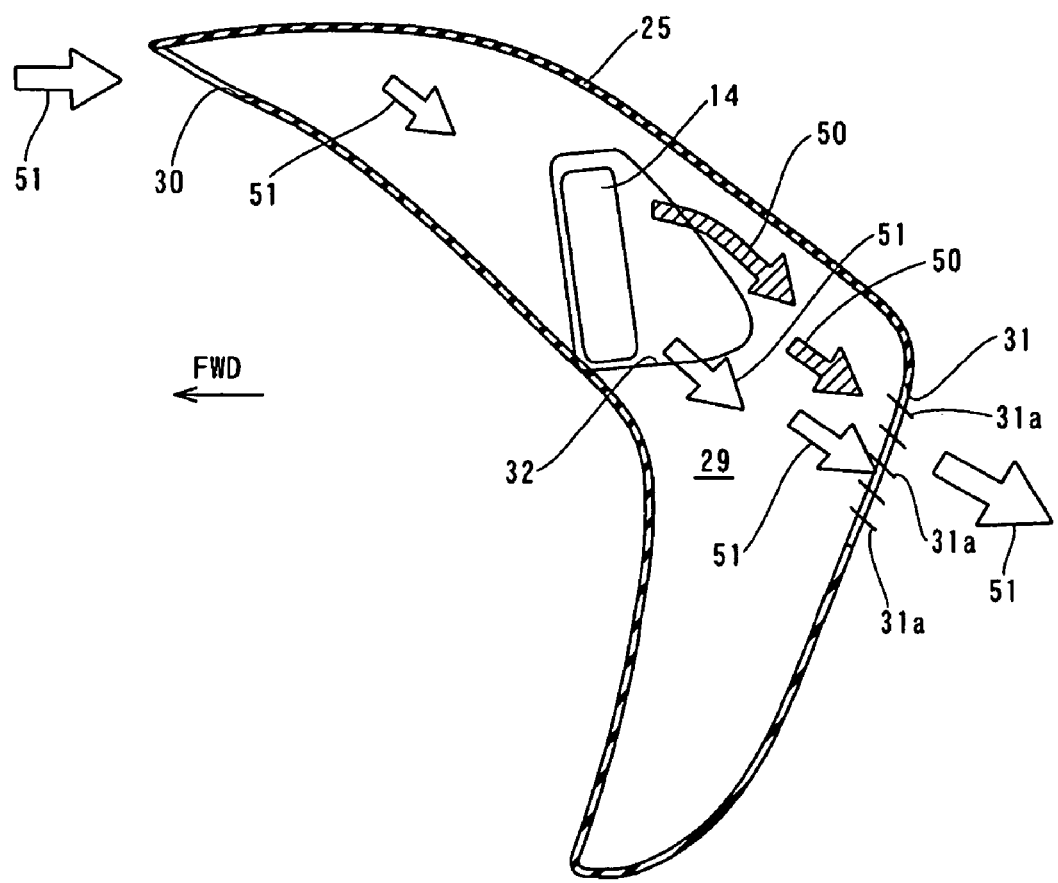
FIG. 16 is another cross sectional view for describing the flow of the running wind relative to the wind guiding wall of the motorcycle according to the preferred embodiment shown in FIG. 1.

As shown in FIGS. 14-16, each leg shield 27 has a wind guiding passage 29 to guide the running wind 50 that has passed through the core section 14c of the radiator 14 outside of the vehicle body. As shown in FIG. 15, each wind guiding passage 29 is defined using the respective leg shield 27 and the respective wind guiding wall 28. Also, as shown in FIGS. 3, 14 and 16, each wind guiding passage 29 has an inlet opening 30 to directly introduce a running wind 51 from the outside at a forward and upper location of the wind guiding passage 29 in the running direction (the arrow FWD direction). Further, each wind guiding passage 29 has an outlet opening 31 to guide the running wind 50, 51 at a rear and lower location of the wind guiding passage 29 in the running direction (the arrow FWD direction). Also, each outlet opening 31 has a plurality of louvers 31a extending rearward and downward. Further, an opening 32 is formed between the inlet opening 30 and the outlet opening 31 to guide the running wind 50 that has passed through the core section 14c (see FIG. 14) of the radiator 14 to each wind guiding passage 29. Incidentally, the inlet opening 30 is an example of the "first opening" of the present invention, while the outlet opening 31 is an example of the "second opening" of the present invention. Also, the opening 32 is an example of the "third opening" of the present invention. In addition, the running wind 50 that has passed through the core section 14c of the radiator 14 can be taken into the respective wind guiding passage 29 using the airflow of the running wind 51 to the outlet opening 31 from the inlet opening 30. Thus, the running wind 50 that has passed through the core section 14c of the radiator 14 can be easily introduced into the wind guiding passage 29. Thereby, a larger amount of running wind 50 can pass through the core section 14c of the radiator 14.

As described above, the vehicle according to the present preferred embodiment is constructed such that, in an underbone type motorcycle 1 that has the main frame 3 extending downward and rearward from the head pipe 2, the wind guiding walls 28 that guide the running wind 50 to the radiator 14 are attached to the leg shields 27 covering the front sides of the legs of the driver. Each wind guiding wall 28 includes the forward section 28b that protrudes forward from the front end surface of the opening 60 of the respective leg shield 27 and the rear section 28c that has the rear end 28d positioned adjacent to one of the lateral side ends 14d of the core section 14c. Thus, the running wind 50 introduced from the forward section 28b of each wind guiding wall 28 is guided to the whole core section 14c of the radiator 14 by the rear end 28d of each wind guiding wall 28. Accordingly, a sufficient amount of the running wind 50 can be guided to the core section 14c of the radiator 14. As a result, the cooling water in the radiator 14 can be sufficiently cooled, and thus the engine 13 can be sufficiently cooled. Also, the forward section 28b of each wind guiding wall 28 protrudes forward from the front end surface of the respective leg shield 27. Thereby, the distance between the radiator 14 and the front end of the forward section 28b of each wind guiding wall 28 can be larger than the distance between the radiator 14 and the front end surface of the opening 60 of each leg shield 27. Thus, even if the distance between the radiator 14 and the front end surface of the opening 60 of each leg shield 27 is smaller, the forward section 28b of each wind guiding wall 28 can prevent the wind guiding distance of the running wind 50 to the radiator 14 from being too short. As a result, a decrease in the wind guiding amount, which is likely to be caused when the distance of the running wind 50 to the radiator 14 is too short, can be prevented from occurring. Thus, a more sufficient amount of the running wind 50 can be guided to the core section 14c of the radiator 14.

Also, in the present preferred embodiment, the rear section 28c of each wind guiding wall 28 covers the respective front side of the tank section 14a or 14b of the radiator 14, and substantially does not cover the front side of the core section 14c of the radiator 14. Thereby, the running wind 50 can be directly guided to the core section 14c by the pair of wind guiding walls 28 without impinging the tank sections 14a and 14b, and thus a larger amount of running wind 50 can be guided to the core section 14c of the radiator 14.

Also, in the present preferred embodiment, each wind guiding wall 28 is arranged to extend inward in the width direction (the direction A of FIG. 3) of the vehicle body to the rear section 28c of the wind guiding wall 28 from the forward section 28b of the wind guiding wall 28. Thereby, the running wind 50 flowing through a more outside location can be guided to the core section 14c of the radiator 14, and thus a larger amount of running wind 50 can be guided to the core section 14c of the radiator 14.

Also, in the present preferred embodiment, each wind guiding wall 28 is arranged such that the expanding angle θ1 of the forward section 28b of the wind guiding wall 28 that expands forward is larger than the expanding angle θ2 of the forward portion 27b of the respective leg shield 27 that expands forward. Thereby, the respective forward sections 28b of the pair of wind guiding walls 28 can guide the running wind 50 with a larger width than the width of the opening of the forward sections 27b of the pair of leg shields 27, and thus, a larger amount of running wind 50 can be guided to the radiator 14. Thereby, a more sufficient amount of running wind 50 can be guided to the radiator 14, and thus the engine 13 can be more sufficiently cooled.

Also, in the present preferred embodiment, because the forward section 28b of each wind guiding wall 28 protrudes forward with the expanding angle θ1 that is larger than the expanding angle θ2 of the forward portion 27b of the respective leg shield 27, even though each leg shield 27 is arranged to extend inward in the width direction (the direction A of FIG. 3) of the vehicle body, a sufficient amount of the running wind 50 can be guided to the radiator 14.

Also, in the present preferred embodiment, the pair of wind guiding walls 28 is attached to the pair of leg shields 27 positioned on both the lateral sides of the radiator 14. As a result, the pair of wind guiding walls 28 can guide the running wind 50 on both the lateral sides of the radiator 14, and thus the running wind 50 guided to the radiator 14 can be increased.

Also, in the present preferred embodiment, because each wind guiding passage 29 includes only the respective leg shield 27 and the respective wind guiding wall 28, the number of parts can be prevented from increasing even though the wind guiding passages 29 are provided.

Also, in the present preferred embodiment, because the size of the forward section 28b of each wind guiding wall 28 in the fore to aft direction becomes larger while approaching the bottom of the wind guiding wall 28, the following effects can be obtained. That is, as shown in FIG. 2, a front periphery of each leg shield 27 has a certain forward-slant angle to demonstrate the compactness of the vehicle in a side exterior view. However, on the other hand, in order to keep good cooling performance, it is difficult to have the radiator 14 slant more than a certain angle because the radiator 14 uses the running wind that comes from the front to cool itself. It is difficult to ensure the size in the fore to aft direction for guiding the wind in a lower portion of the radiator 14 only by the leg shield 27. Therefore, in the present preferred embodiment, as described above, the size of the forward section 28b of each wind guiding wall 28 in the fore to aft direction becomes larger toward the lower section of the wind guiding wall 28. As a result, the size in the fore to aft direction for guiding the wind in the lower portion of the leg shield 27 can be easily ensured by the wind guiding walls 28. In addition, the size of each wind guiding wall 28 in height is smaller than the size of the respective leg shield 27 in height in the side view. Consequently, the front periphery of the leg shield 27 that has the certain forward-slant angle can be recognized in the side view, even though the wind guiding walls 28 are provided. Thus, the function of the periphery of the leg shield 27 for demonstrating the compactness of the vehicle in a side exterior view can be ensured.

Also, in the present preferred embodiment, because the size of each wind guiding wall 28 in height is larger than the size of the radiator 14 in height in the side view, the wind guiding walls 28 can guide a larger amount of the running wind to the radiator 14. The cooling performance of the radiator 14 can thus be improved.

Additionally, it should be noted that the disclosed preferred embodiment is not limiting but is explanatory in all respects. Therefore, the scope of the present invention is defined not by the description of the preferred embodiment above but by the claims, and further includes all alternatives, variations and modifications that all within the scope of the claims.

For example, in the foregoing preferred embodiment, the under-bone type motorcycle which has the low main frame is shown as an example of the vehicle. The present invention, however, is not limited to that preferred embodiment, and can apply to vehicles other than a motorcycle such as, for example, a three-wheeled vehicle and an ATV (all terrain vehicle), if those vehicles are under-bone type vehicles that have a heat exchanger for cooling an engine thereof.

Also, in the foregoing preferred embodiment, the example in which the pair of wind guiding walls is positioned on both the lateral sides of the radiator is shown. However, the present invention is not limited to that preferred embodiment, and only one piece of the wind guiding wall can be provided on one of the lateral sides of the radiator.

Further, in the foregoing preferred embodiment, the example in which the respective rear sections of the pair of the wind guiding walls are positioned to cover the front side of the respective tank sections is shown. The present invention, however, is not limited to that preferred embodiment, and the respective rear sections of the pair of the wind guiding walls can be positioned not to cover the front side of the respective tank sections.

Still further, in the foregoing preferred embodiment, the case in which the radiator having the tank sections positioned on both the lateral sides of its core section is used is shown. However, the present invention is not limited to that preferred embodiment, and the same effects and advantages can be obtained in a case that a radiator having a tank section(s) positioned at a top or bottom of the core section is used.

While the present invention has been described in detail, the foregoing description is in all aspects illustrative and not restrictive. It is understood that numerous other modifications and variations can be devised without departing from the scope of the invention.

What is claimed is:

1. A vehicle comprising:
 a head pipe;
 a frame connected to the head pipe and arranged to extend downward and rearward;
 an engine disposed below the frame;
 a leg shield arranged to cover a front side of a leg of a driver, the leg shield having an opening in a forward area thereof;
 a heat exchanger arranged within the opening of the leg shield to cool the engine, the heat exchanger including a core section over which running wind passes, and the core section includes two opposed lateral side ends; and
 a pair of wind guiding walls attached to the leg shield and arranged to guide the running wind to the heat exchanger; wherein
 each of the pair of wind guiding walls includes a forward section that protrudes forward from a front end surface of the opening of the leg shield, and a rear section that has a rear end positioned adjacent to a respective one of the two opposed lateral side ends of the core section of the heat exchanger.

2. The vehicle as set forth in claim 1, wherein the heat exchanger further includes a tank section arranged at one of the two opposed lateral side ends of the core section, and the rear section of the at least one of the pair of wind guiding walls covers a front side of the tank section of the heat exchanger and substantially does not cover a front side of the core section of the heat exchanger.

3. The vehicle as set forth in claim 2, wherein each of the pair wind guiding walls is arranged to extend inward in a width direction of the vehicle from the forward section toward the rear section of the respective wind guiding wall.

4. The vehicle as set forth in claim 1, wherein each of the pair of wind guiding walls is arranged to extend inward in a width direction of the vehicle from the forward section toward the rear section of the respective wind guiding wall.

5. The vehicle as set forth in claim 1, wherein a forward-expanding angle of the forward section of each of the pair of wind guiding walls is larger than a forward expanding angle of a forward portion of the opening of the leg shield.

6. The vehicle as set forth in claim 5, wherein the front end surface of the forward portion of the opening of the leg shield is arranged to extend forward and inward in the width direction of the vehicle body.

7. The vehicle as set forth in claim 1, wherein the leg shield includes a pair of leg shields that are spaced apart from each other at a predetermined distance in the width direction of the vehicle and arranged on both sides of the heat exchanger, and the pair of wind guiding walls are attached to the pair of leg shields on the both sides of the heat exchanger.

8. The vehicle as set forth in claim 1, further comprising a wind guiding passage defined by at least the leg shield and the pair of wind guiding walls to guide the running wind that has passed through the core section of the heat exchanger to outside of the vehicle.

9. The vehicle as set forth in claim 8, wherein the wind guiding passage includes a first opening to introduce a running wind directly from the outside of the vehicle, a second opening to guide the running wind back to the outside of the vehicle, and a third opening positioned between the first opening and the second opening to guide the running wind that has passed through the core section of the heat exchanger to the wind guiding passage.

10. The vehicle as set forth in claim 9, wherein the third opening is arranged in an area surrounded by the leg shield and the rear section of at least one of the pair of wind guiding walls.

11. The vehicle as set forth in claim 10, wherein the heat exchanger further includes a tank disposed at the lateral side end of the core section, and the tank of the heat exchanger is arranged within the third opening that is positioned in the area surrounded by the rear section of at least one of the pair of wind guiding walls and the leg shield.

12. The vehicle as set forth in claim 1, wherein a size of the forward section of each of the pair of the wind guiding walls in a fore to aft direction becomes larger toward a lower section of the respective wind guiding wall.

13. The vehicle as set forth in claim 1, wherein a size of each of the pair of wind guiding walls in height is larger than a size of the radiator in height from a side view of the vehicle.

14. The vehicle as set forth in claim 1, wherein a size of each of the pair of wind guiding walls in height is smaller than a size of the leg shield in height from a side view of the vehicle.

* * * * *